United States Patent
Walters

[11] 3,821,924
[45] July 2, 1974

[54] DAMPER MECHANISM FOR KITCHEN VENTILATING SYSTEMS

[75] Inventor: Jack W. Walters, Buffalo Grove, Ill.

[73] Assignee: Doane Manufacturing Company, Wheeling, Ill.

[22] Filed: Jan. 15, 1973

[21] Appl. No.: 323,931

[52] U.S. Cl. ............................... 98/115 K, 126/286
[51] Int. Cl. ............................................ F23j 11/02
[58] Field of Search............ 98/115 K; 126/285, 286

[56] References Cited
UNITED STATES PATENTS

| | | | |
|---|---|---|---|
| 3,065,687 | 11/1962 | Graswich et al. | 98/115 K |
| 3,433,146 | 3/1969 | Russell | 98/115 K |
| 3,589,266 | 6/1971 | Hike et al. | 98/115 K |
| 3,611,909 | 10/1971 | Gaylord | 98/115 K |

Primary Examiner—Meyer Perlin
Assistant Examiner—Ronald C. Capossela
Attorney, Agent, or Firm—Wolfe, Hubbard, Leydig, Voit & Osann, Ltd.

[57] ABSTRACT

A damper mechanism for kitchen ventilators including a damper door journalled for movement between open and closed positions within the ventilator system. A spring urges the damper door toward its closed position, and a mechanical latch located outside the ventilator system includes a first latching element connected to the door and a second latching element mounted for movement between latched and unlatched positions. A solenoid moves the second latching element to its unlatched position when the solenoid is energized, thereby releasing the damper door for movement to its closed position. A manual reset plunger is connected to the damper door.

9 Claims, 5 Drawing Figures

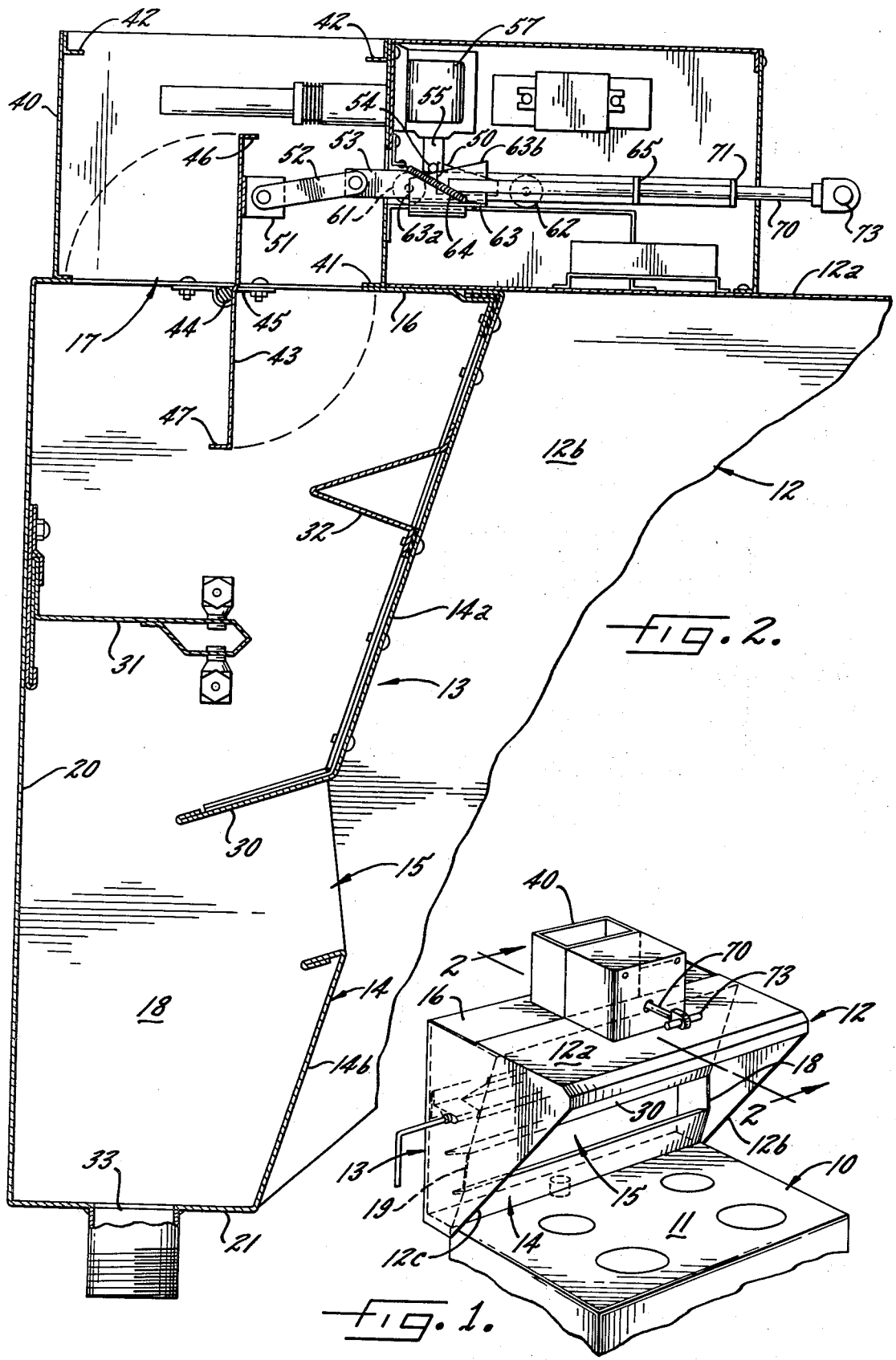

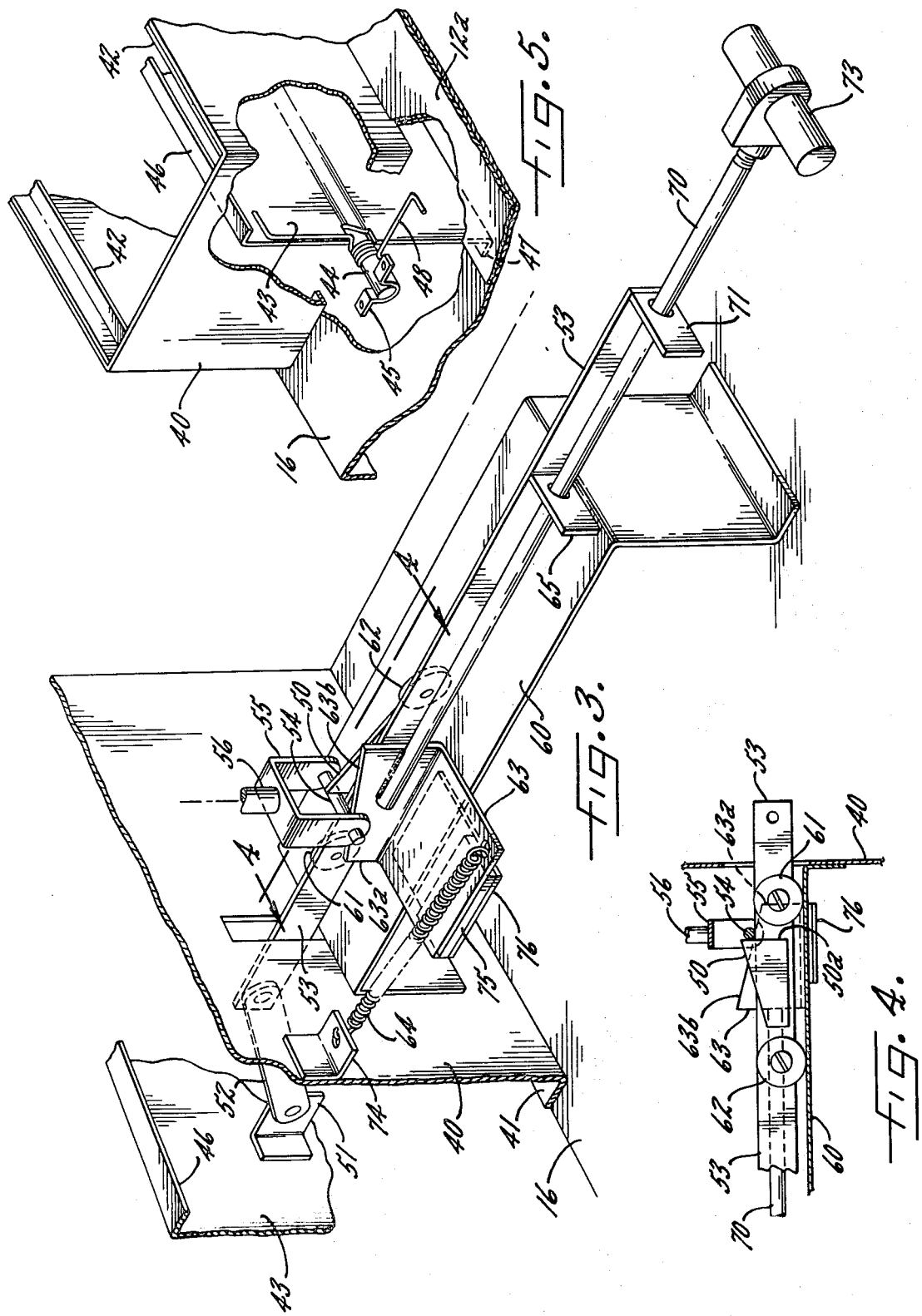

DAMPER MECHANISM FOR KITCHEN VENTILATING SYSTEMS

DESCRIPTION OF THE INVENTION

The present invention relates generally to kitchen ventilating systems and, more particularly, to an improved damper mechanism for kitchen ventilating systems.

It is a primary object of the present invention to provide an improved kitchen ventilator damper mechanism which is capable of closing the ventilator system either automatically when a fire occurs in the system or manually whenever the operator desires to close the system.

Another object of the invention is to provide such an improved damper mechanism which is positive-acting and which provides reliable operation over a long operating life.

A further object of the invention is to provide such an improved damper mechanism which is fail-safe.

Yet another object of the invention is to provide such an improved damper mechanism which can be efficiently manufactured from a relatively small number of parts.

A still further object of the invention is to provide such an improved damper mechanism which does not normally consume any electrical power.

Still another object of the invention is to provide an improved damper mechanism of the foregoing type in which all the operative parts other than the damper door are located outside the ventilator system so that they are not exposed to the deleterious conditions inside the ventilator system.

Other objects and advantages of the invention will become apparent from the following detailed description and upon reference to the accompanying drawings, in which:

FIG. 1 is a perspective view of a conventional cooking range and its associated ventilating system including a damper mechanism embodying the present invention;

FIG. 2 is an enlarged vertical section taken along line 2—2 in FIG. 1;

FIG. 3 is an enlarged perspective of the damper mechanism of FIGS. 1 and 2;

FIG. 4 is a section taken along line 4—4 in FIG. 3; and

FIG. 5 is an enlarged perspective view of one end of the damper door portion of the damper mechanism of FIGS. 1 and 2.

While the invention will be described in connection with a certain preferred emboidment, it will be understood that it is not intended to limit the invention to this particular embodiment. On the contrary, it is intended to cover all alternatives, modifications, and equivalent arrangements as may be included within the spirit and scope of the invention as defined by the appended claims.

Turning now to the drawings and referring first to FIG. 1, there is shown a cooking range 10 having a cooking surface 11 from which hot fumes laden with grease and oil vapors and other condensable contaminants rise upwardly toward a canopy or hood 12 which projects out over at least a portion of the cooking surface 11. The hood 12 comprises a top 12a and a pair of side walls 12b and 12c, and is mounted on a grease extractor 13 having a front wall 14 forming a vertically restricted, horizontally elongated entranceway 15, and a top wall 16 forming an exit opening 17. The remainder of the extractor is completely enclosed by a pair of sidewalls 18 and 19, a rear wall 20, and a bottom wall 21.

As the hot, grease-laden fumes rise upwardly beneath the hood 12, they are drawn into and through the extractor 13 by means of a fan or blower (not shown) mounted within a flue or vent duct connected to the exit opening 17. The rate at which the exhaust stream is drawn through the extractor 13 is determined by the downstream blower, a typical flow rate being 300 cubic feet per minute per lineal foot of ventilator (cfm). As the exhaust stream leaves the extractor 13, it is conducted via the vent duct to an appropriate outlet for discharge to the atmosphere. It will be understood that an in-duct blower represents only one example of a suitable device for drawing the exhaust stream through the grease extractor, and that the invention is equally applicable to ventilating systems employing other air moving devices, such as power roof ventilators and the like.

As the hot exhaust stream enters the grease extractor 13, the relatively narrow vertical dimension of the entranceway 15 increases the velocity of the exhaust stream, while the horizontal elongation of the entranceway insures the collection of vapors across the full width of the cooking surface. The entering exhaust stream is deflected downwardly and rearwardly over the bottom wall 21 by means of an entrance baffle 30 formed as an integral part of the top portion 14a of the front wall, and inclined downwardly toward the bottom wall 21 at an angle of 18° from the horizontal. Both the top and bottom portions 14a and 14b of the front wall slope rearwardly from top to bottom with the bottom portion 14b being offset forwardly from the top portion 14a so that the upper and lower horizontal edges of the entranceway are in substantial vertical alignment whereby any liquid dripping from the underside of the entrance baffle 30 falls inside the front wall portion 14b. At the rear of the extractor the rear wall 20 deflects the velocious exhaust stream upwardly past the rear edge of the entrance baffle 30 until the stream is deflected forwardly by a rear baffle 31 projecting forwardly from the rear wall 20 at least as far as the rear edge of the entrance baffle 30, and spaced upwardly therefrom. The exhaust stream flows forwardly over the entrance baffle 30 until it is deflected upwardly again by the top portion 14a of the front wall 14. Thus, it can be seen that the combination of the entrance baffle 30, the bottom wall 21, the rear wall 20, and the rear baffle 31 effects a 180° reversal in the direction of flow of the exhaust stream. That is, the exhaust flows rearwardly beneath the entrance baffle 30 as it enters the housing, and is then quickly reversed so as to flow toward the front of the housing above the entrance baffle 30. The centrifugal action resulting from this flow reversal causes a substantial portion of the condensable grease and oil entrained in the exhaust stream to be deposited or plated out on the surrounding walls and baffle surfaces, thereby providing an ititial extraction stage. The extracting action in this initial stage is enhanced by an increase in the volume of the extraction chamber in which flow reversal is effected. More particularly, the volume of the chamber formed by the lower portion 14b of the front wall 14, the bottom wall 21, and the rear wall 20 increases in the area adjacent the juncture of the bottom wall 21 and the rear wall 20, thereby causing the exhaust stream to expand simultaneously with the reversal in its direction of flow, with resultant condensation and agglomeration of the grease and oil vapors therein. A smaller secondary expansion chamber is formed in the area adjacent the juncture of the rear wall 20 and the rear baffle 31, with similar effect.

As the exhaust stream moves forwardly over the entrance baffle 30, its direction of flow is reversed a second time by the deflecting action of a top baffle 32 secured to the upper front wall 14a above the rear baffle 31. This baffle 32 deflects the rising exhaust stream rearwardly above the rear baffle 31, and the stream then passes straight up through the exit opening 17 into the vent duct. A pair of expansion chambers are again provided in the course of the second flow reversal, namely in the areas adjacent the juncture of the entrance baffle 30 and the front wall portion 14a, and adjacent the juncture of the front wall portion 14a and the baffle 32. The resulting expansion of the velocious exhaust stream and the concurrent centrifugal action from the 180° turn in the fluid flow again produces a heavy deposition or plating out of the agglomerated grease and oil on the surrounding wall and baffle surfaces.

Since the grease extractor is located directly over or adjacent to the cooking surface 11, the surfaces of the extractor walls and the internal baffles on which the extracted grease and oil is deposited, are at a sufficiently high temperature to cause the deposited material to remain in a fluid condition and run down to the bottom of the housing. This grease and oil eventually collect on the bottom wall 21 where they flow out of the extractor through a drain opening 33. The extracted grease and oil is thus continuously removed from the extractor, thereby avoiding any substantial accumulation of condensed materials which might become re-entrained in the exhaust stream or which might present a fire hazard. From the drain opening 33, the condensed materials are conducted through a drain line (not shown) to a suitable external receptacle for disposal.

The grease extractor described thus far is not a part of the present invention and is described in more detail in a copending application Ser. No. 296,128 filed Oct. 10, 1972 by D. H. Doane and assigned to the assignee of the present invention.

The damper mechanism shown in FIGS. 1–3 includes a damper enclosure 40 adapted to form a part of the ventilator system. Thus, the lower end of the enclosure forms an integral flange 41 adapted to be secured to the top 16 of the grease extraction unit, while the top portion of the enclosure 40 includes a plurality of duct stops 42 adapted to engage the end of a duct telescoped into the open upper end of the enclosure 40. With this arrangement, the exhaust stream discharged from the top of the grease extraction unit passes through the enclosure 40 and then on through the associated duct for discharge into the atmosphere.

For the purpose of closing the ventilator system, in the event that a fire occurs in the ventilator system, for example, a damper door 43 is pivotally mounted on the top 16 of the grease extractor so that the door can be moved between an open position where the door is disposed vertically, substantially parallel to the path of fluid flow, as illustrated in FIG. 1, and a closed position where the door is disposed horizontally, substantially parallel to the extractor top 16 and normal to the path of fluid flow. Pivotal movement of the door is permitted by mounting the door 43 on a shaft 44 which is journalled in a pair of clamps 45 fastened to the underside of the extractor top 16 on opposite sides of the exit opening 17. To improve the stiffness of the door 43 and to prevent it from warping when subjected to excessive temperatures, for example, a pair of integral flanges 46 and 47 are formed on opposite side edges of the door, the flanges 46 and 47 being bent at 90° to the main body portion of the door 43.

In accordance with one important aspect of the present invention, a biasing means urges the damper door toward its closed position, a mechanical latch located outside the ventilator has a first latching element connected to the door and a second latching element mounted for movement for between latched and unlatched positions, and a solenoid moves the second latching element to its unlatched position in response to energization of the solenoid whereby the damper door is automatically released for movement to its closed position by the biasing means. Thus, in the illustrative embodiment a biasing spring 48 continuously urges the damper door 43 in the counterclockwise direction as viewed in FIG. 2, toward its closed position.

To hold the damper door 43 in its open position, against the urging of the biasing spring 48, the door 43 is connected to a latching element 50 by means of a bracket 51 fastened to the door and a link 52 which is pivotally connected at one end to the bracket 51 and at the other end to an elongated bar 53 which carries the latching element 50. The vertical edge 50a (FIG. 4) of the latching element 50 engages a horizontal rod 54 carried by an inverted U-shaped bracket 55 on the end of a rod 56 operated by a conventional solenoid 57. When the solenoid 57 is energized, it raises the rod 56 and thus the rod 54 above the uppermost edge of the latching element 50 so that the bar 53 can move to the left as viewed in FIG. 3 to permit closing of the damper door 43 under the urging of the drive spring 48. As the damper door is closed, the pivotal connections of the link 52 to the bracket 51 and the bar 53 permits the bracket 51 to be lowered relative to the fixed vertical position of the bar 53.

For the purpose of facilitating movement of the bar 53 when the latch is released by upward movement of the rod 54, the bar 53 is supported externally of the housing 40 on an elongated plate 60 by means of a pair of small wheels 61 and 62. The wheels 61 and 62 are journalled on the bar 53 so that there is very little friction to resist movement of the bar 53 under the urging of the spring 48.

When the rod 54 is raised by the solenoid 57, it also releases a cam-stop member 63 for advancing movement under the urging of a biasing spring 64. The member 63 advances until the leading vertical edge 63a thereof abuts the wall of the housing 40; then as the bar 53 continues to advance past the stopped member 63, a bracket 65 near the trailing end of the bar 53 eventually engages the trailing side of the member 63 to positively stop the bar 53 at precisely that point at which the door 43 reaches its closed horizontal position. Of course, the spring 48 holds the door 43 in this closed position until the door is returned to its closed position by a force greater than that exerted by the spring 48.

To open the door and reset the latch, one end of a resetting or cocking rod 70 is welded to the cam-stop member 63 with the other end of the rod 70 extending outwardly through the bracket 65 and a similar second bracket 71 fastened to the bar 53. The outer end of the rod 70 is provided with a handle 73 which is gripped by the operator and drawn outwardly away from the housing 40 to return the bar 53 to its normal retracted position, thereby returning the door 43 to its open position against the urging of the spring 48. More specifically, retracting movement of the cam-stop member 63 pushes the bracket 65, and thus the rod 54, back to their starting positions shown in FIG. 3. Then when the rod 70 is released by the human operator, the spring 64 returns the member 63 toward the housing 40 until the top edge 63b thereof engages the rod 54. Of course, this return movement of the member 63 also returns the rod 70 to its starting position shown in FIG. 3.

If the solenoid 57 is de-energized before the resetting operation, the rod 54 is lowered by gravity and rests on the top of the cam-stop 63, which abuts the wall of the housing 40 before it clears the rod 54. Then as the rod 70 and bar 53 are retracted, the rod 54 rides down the top surface of the member 63 until it engages the top edge of the latching element 50, which is inclined to form a cam surface for raising the rod 54. When the latching element 50 clears the rod 54, the rod 54 drops down along the leading vertical edge 50a of the latching element 50 to latch the damper door 43 in the open position. When the operator feels the click of the rod 54 dropping off the leading edge of the latching element 50 onto the bar 53, the reset rod 70 is released, and a return spring 64 returns the reset rod 70 and the bar 53 to their positions as illustrated in FIG. 3.

The return spring 64 is fixed at one end to a mounting bracket 74 welded to the wall of the housing 40, while the other end of the spring is connected to a laterally projecting base portion of the cam-stop 63. Depending from the underside of the base portion of the cam-stop 63 is a mounting block 75 carrying a guide plate 76 which extends under the plate 60 in sliding engagement therewith to stabilize the overall assembly riding on the plate 60.

As a further feature of the invention, a manually operable release means is provided for manually moving one of the latching elements to its unlatched position whereby the damper door is manually released for movement to its closed position by the drive spring 48. Thus, in the illustrative embodiment, the upper edge 63b of the cam-stop 63 is designed so that it raises the rod 54 above the latching element 50 when the reset rod 70 is advanced to the left as viewed in FIG. 3. The leading vertical edge 63a of the cam-stop 63 comes into engagement with the wall of the housing 40 before the cam surface 63a clears the rod 54 so that the surface 63a lremains in engagement with the rod 54 to hold it in its raised or unlatched position until the reset rod 70 is retracted to reset the latch in the same manner described previously.

I claim as my invention:

1. A damper mechanism for a kitchen ventilator system, said damper mechanism comprising the combination of a damper door journalled for movement between open and closed positions within the ventilator system; biasing means acting directly on said damper door to constantly urge said door toward said closed position; a mechanical latch located outside the ventilator system and including a first latching element operatively connected to said door and a second latching element mounted for reciprocating movement between latched and unlatched positions, said second latching element being mounted above said first latching element in the unlatched position and adjacent thereto in the latched position and having a vertical path of reciprocating movement between said latched and unlatched positions so that the weight of the second latching element itself normally maintains it in the latched position; a solenoid directly connected to said second latching element for raising said second element to said unlatched position in response to energization of the solenoid whereby said damper door is automatically released for movement to said closed position by said biasing means; manually operable release means for manually raising said second latching element to said unlatched position whereby said damper door is manually released for movement to said closed position by said biasing means; and reset means for returning said damper door from said closed position to said open position against the urging of said biasing means.

2. A damper mechanism as set forth in claim 1 wherein said reset means and said manually operable release means are both operated by a single manually operable member, said member operating said release means when moved in a first direction and operating said reset means when moved in a second direction.

3. A damper mechanism as set forth in claim 1 wherein said reset means is a manually operated cocking rod adapted to override said biasing means for returning said damper door from said closed position to said open position.

4. A damper mechanism as set forth in claim 1 wherein said first latching element includes a cam surface for camming said second latching element away from said latched position during the return movement of said door from said closed position to said open position.

5. A damper mechanism as set forth in claim 1 which includes stop means for positively stopping said door at said closed position upon release of said mechanical latch.

6. A damper mechanism as set forth in claim 1 wherein said manually operable release means includes cam means for camming said second latching element from said latched position to said unlatched position.

7. A damper mechanism as set forth in claim 1 which includes second biasing means urging said manually operable release means into engagement with said second latching element.

8. A damper mechanism as set forth in claim 1 which includes means for resetting said manually operable release means.

9. A damper mechanism as set forth in claim 8 wherein said reset means, said manually operable release means, and said means for resetting said manually operable release means are all operated by a single manually operable member, said member operating said release means when moved in a first direction and operating said reset means and said means for resetting said release means when moved in a second direction.

* * * * *